United States Patent [19]
Houston et al.

[11] 3,778,756
[45] Dec. 11, 1973

[54] METHOD AND APPARATUS FOR VISUAL IMAGING OF ULTRASONIC ECHO SIGNALS UTILIZING A SINGLE TRANSMITTER

[75] Inventors: John M. Houston; Jack D. Kingsley, both of Schenectady, N.Y.

[73] Assignee: General Electric Company, Schenectady, N.Y.

[22] Filed: Sept. 1, 1972

[21] Appl. No.: 285,910

[52] U.S. Cl. ............................. 340/5 MP, 73/67.7
[51] Int. Cl. ............................................. G01s 9/66
[58] Field of Search ................. 340/1 R, 3 R, 5 MP, 340/5 H; 73/67.7, 67.5 R, 67.5 H

[56] References Cited
UNITED STATES PATENTS
3,548,642  12/1970  Flaherty et al. ............... 340/5 MP X

*Primary Examiner*—Richard A. Farley
*Attorney*—John F. Ahern et al.

[57] ABSTRACT

Visual image conversion of ultrasonic echo signals utilizes a single acoustic transmitter for generating pulsed ultrasonic signals directed at an object being examined. An acoustic lens or reflector images object-reflected ultrasonic signals (echoes) onto a single row of acoustic detectors and such echo signals resulting from each incident ultrasonic signal are stored in a memory component associated with the detectors. The memory is subsequently read out sequentially for visually displaying the ultrasonic echo signals stored in the memory component on a line-by-line basis on a conventional cathode ray tube or other serial input visual display device. Alternatively, no memory is required and the echo signals are displayed more rapidly on a multi-beam cathode ray tube or other parallel input visual display device. The sequence can be repeated many times a second permitting display of motion of the object.

28 Claims, 8 Drawing Figures

METHOD AND APPARATUS FOR VISUAL IMAGING OF ULTRASONIC ECHO SIGNALS UTILIZING A SINGLE TRANSMITTER

Our invention relates to a method and apparatus deriving a motion picture type visual display of the interior of objects such as biological organs, and in particular, to an apparatus for rapidly converting ultrasonic signals reflected from the particular object wherein the incident ultrasonic signals are generated from a single acoustic transmitter.

Visual image conversion of ultrasonic echo signals is used in medical diagnostics in the examination of biological tissues and organs, and in industry in the inspection of manufactured objects for internal flaws as two typical examples. Prior to our invention, ultrasonic inspection was performed by mechanically scanning a single narrow beam quartz crystal (transmitter) along a line lying parallel to the surface of the object to be examined. The crystal may be pulsed approximately 100 times per second, and after each pulse the crystal also functions as a piezoelectric detector for detecting the object-reflected ultrasonic echoes which are displayed versus time on one line of a cathode ray tube display. As the crystak is mechanically scanned along the line, the cathode ray tube display progresses from line to line thereby forming an entire image (frame) in a few seconds, e.g., a 500 line image would take 5 seconds to produce at 100 pulses per second, which several second process makes it impossible to obtain a visual display with any reasonable resolution of an object undergoing motion such as the beating of a human heart.

A recent improvement in the field of visual image conversion of ultrasonic echo signals is disclosed in a copending patent application Ser. No. 156,226 entitled "Ultrasonic Inspection Apparatus," inventor Henry A.F. Rocha, filed June 24, 1971, now abandoned, in favor of a continuation application Ser. No. 290,253 filed Sept. 18, 1972, and assigned to the assignee of the present invention. The Rocha apparatus utilizes a planar array of $n^2$ acoustic detectors each associated with a light emitting element to produce a visual display of a planar slice of the object being examined which plane lies parallel to the planar array of acoustic detectors. In contradistinction, our invention utilizes only n acoustic detectors arranged in a single row and provides a visual display of a planar slice of the object being examined which lies in a plane defined by the centerline axis of signal propagation from the acoustic transmitter to the object and the axis of the acoustic detectors, that is, when both arrays of detectors are positioned directly in front of the object to be examined, Rocha's display is a planar slice parallel to the front of the body whereas our display is a planar slice normal thereto.

A concurrently filed patent application Ser. No. 285,913 entitled "Method and Apparatus for Visual Imaging of Ultrasonic Echo Singals Utilizing Multiple Transmitters for Reduced Specular Reflection Effects", inventor John M. Houston, and assigned to the assignee of the present invention, is directed to an apparatus of the type described in our present application, but utilizing several transmitters oriented at different angles about the object being examined.

Therefore, one of the principal objects of our invention is to provide an improved method and apparatus for ultrasonic imaging.

Another object of our invention is to provide an improved method and apparatus for visual imaging of ultrasonic signals.

A further object of our invention is to provide a method and apparatus for producing the visual imaging at a sufficiently fast rate for viewing motion of the object being examined.

A still further object of our inention is to provide a visual display of an ultrasonic image of a planar slice through an object being examined.

Another object of our invention is to obtain the visual display after the echo signals have been delayed by temporary storage in a memory.

Another object of our invention is to obtain a high resolution optical display which can be directly and continuously observed.

Briefly stated, our invention is a method and apparatus for providing a visual display of ultrasonic signals reflected from a planar slice through an object being examined. A single acoustic transmitter generates a pulsed ultrasonic wave energy signal in a liquid medium and directed at the object. A plurality of acoustic detectors are arranged in a single row along an axis perpendicular to the centerline axis of signal propagation from the transmitter for simultaneously detecting ultrasonic signals reflected from the object and its internal acoustic heterogeneities in response to the incident signal. An acoustic lens or reflector is utilized for imaging the echo signals onto the acoustic detectors and in one embodiment may be further utilized for directing the generated signals toward the object. The outputs of the detectors are connected to amplifiers which are gated on and off at desired times corresponding to the depth of field in the object being examined. A cathode ray tube or other visual display means is connected to the outputs of the amplifiers for providing the visual display of the echo signals, each sweep line on the cathode ray tube display being associated with a corresponding acoustic detector. The visual display represents a planar slice of the object lying in a plane defined by the centerline axis of signal propagation to the object and the axis of the acoustic detectors. In one embodiment, the outputs of the amplifiers are supplied to a suitable memory which is subsequently sequentially read out on a line-to-line basis on a conventional cathode ray tube for providing a slightly delayed visual display thereon. In a second embodiment, the outputs of the amplifiers are connected directly to the inputs of a multi-beam cathode ray tube or other parallel input visual display means for providing a more rapid visual display of the ultrasonic echo signals. The frequency of periodic transmitter pulsing is sufficiently rapid, and the various signals are of sufficiently short duration such that the sequence of operation of our apparatus may be repeated rapidly thereby permitting a visual display of motion of the object being examined such as the beating of a human heart in the case of an internal medical diagnostic examination.

The features of our invention which we desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character and wherein:

Figure 1:
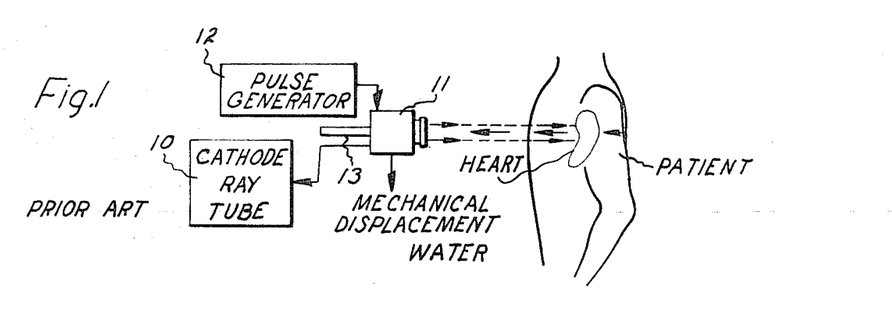
FIG. 1 is a side view of a simplified prior art apparatus for mechanically scanning a single acoustic transmitter along a line parallel to the front of a patient in a medical diagnostic application of ultrasonic imaging.

Referring now to FIG. 1, there is shown a prior art apparatus for obtaining a visual display of ultrasonic images on a conventional cathode ray tube (CRT) 10. As used herein, the term "cathode ray tube" will be meant to include the display tube and all of the electronic circuitry associated with the tube such as the sweep generator, etc. The display depicted on the screen of tube 10 is illustrated in dotted form in FIG. 2. The prior art ultrasonic image is obtained by mechanically scanning a single narrow-beam quartz crystal piezoelectric transducer 11 along a line parallel to the surface of the object being examined. In the particular application illustrated in FIG. 1, the object is a patient having an internal organ such as the heart being examined by ultrasonic imaging. It should be understood that the object being examined need not be of the biological type and may be an article of manufacture being examined for internal flwas or acoustic heterogeneities. By acoustic heterogeneity is meant a discontinuity or separation surface between two media having different acoustic impedances. It should be noted that both in the prior art and the present invention, the ultrasonic transducer transmitter, receiver and object being examined are positioned within a suitable liquid medium such as water for more efficient transmission of the incident and reflected ultrasonic signals. As depicted in FIG. 1, piezoelectric transducer 11 is mechanically scanned along a vertical line lying parallel to the front surface of the patient, the line being of sufficient height to obtain ultrasonic irradiation of the entire heart. This mechanical scanning or displacement of transducer 11 in the vertical direction as depicted in FIG. 1 can be achieved in any suitable manner such as by mounting transducer 11 on a vertically oriented track. The crystal of transducer 11 is pulsed from a suitable electrical pulse source 12 at approximately 100 times per second, and after each pulse, transducer 11 also functions as a piezoelectric detector for detecting the ultrasonic wave energy echoes reflected from the object being examined. After each pulse, the echo signal is displayed versus time on one sweep line of the CRT 10 and as the transducer 11 is mechanically displaced along its track, the CRT display progresses from line to line, thereby forming the entire image of the object within a few second, in the case of a 500 line image the process requiring 5 seconds for a crystal pulsing rate of 100 times per second. The piezoelectric transducer 11 can be mechanically displaced by any suitable means such as a motor-driven member 13 connected to transducer 11. Since this prior art ultrasonic scanner requires approximately 5 seconds to form each complete image (frame), it is obvious that the visual display of motion of the object, that is, a display of a type similar to a conventional television image, is not possible.

Figure 2:
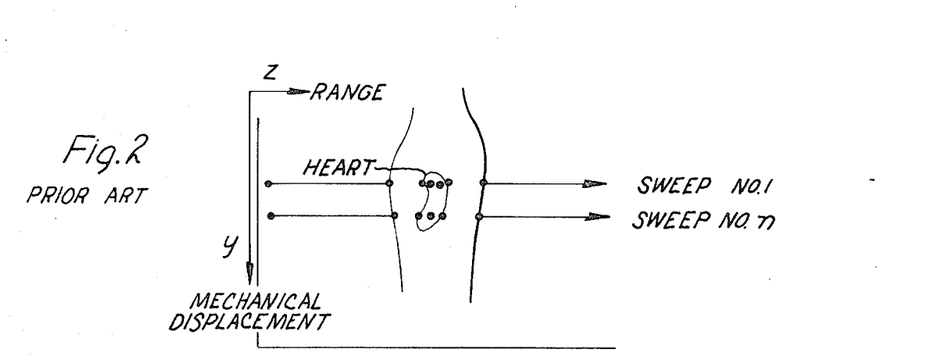
FIG. 2 is a typical cathode ray tube display of the reflected ultrasonic signals versus range obtained from the apparatus illustrated in FIG. 1.

The type of visual display formed on the screen of the CRT 10 is depicted in FIG. 2 wherein the abscissa (Z axis) is in terms of the range from transducer 11 (i.e., a time function) and the ordinate (y axis) is in terms of the mechanical displacement of the transducer. Thus, each horizontal sweep line represents the scan developed by a pulse (or burst of pulses) generated in pulse source 12 and each detected echo signal is depicted as a dot of light (i.e., intensity modulation of CRT electron beam) along the sweep line and represents the range from the transducer to an acoustic heterogeneity. Transducer 11 is moved vertically (in the FIG. 1 view) at a sufficiently slow rate to obtain close spacing of adjacent sweep lines on the CRT display and thereby obtain a visual display having a relatively high resolution for objects which are substantially completely stationary.

Figure 3:
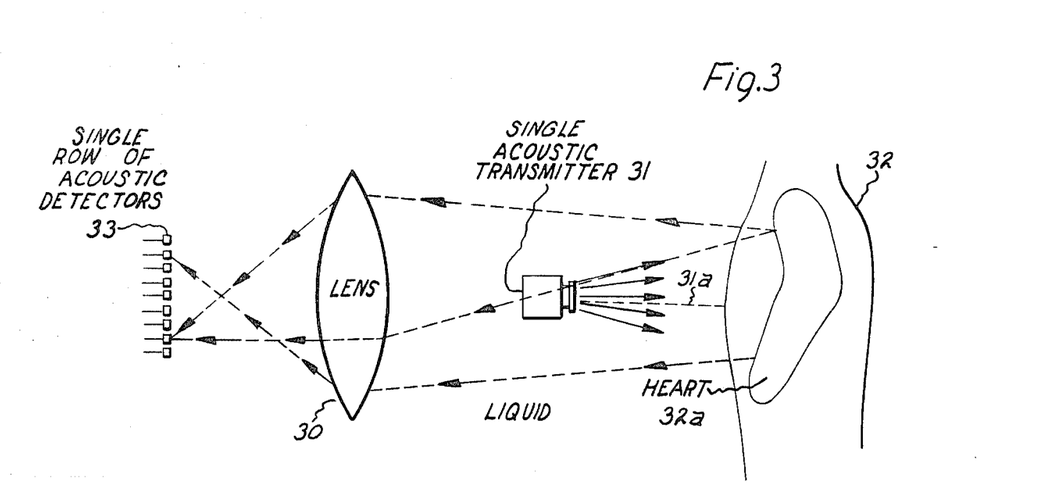
FIG. 3 is a side view of a first embodiment of the ultrasonic imaging components of our invention utilizing a converging type lens for imaging the echo signals onto the acoustic detectors.

Referring now to FIG. 3, there is shown the ultrasonic imaging component portion of a first embodiment of our invention wherein an acoustic imaging or focussing means in the form of an acoustic lens 30 is utilized for receiving ultrasonic reflections from the object 32. Lens 30 focusses the echo signals upon a single row of preferably equally spaced apart acoustic detectors, i.e., images the ultrasonic reflections at the focal plane of lens 30 wherein the focal plane is spaced from the lens a distance greater than the focal point thereof since the lens-incident ultrasonic echo signal wavefront is not planar due to the relatively close spacing of object 32 to the opposite side of the lens. A single acoustic transmitter 31 is positioned between lens 30 and the object 32 being examined, in this particular case the object being the heart 32a of a human patient. Acoustic transmitter 31 is a conventional acoustic transducer which, for example, may include a piezoelectric crystal for converting electrical exciting waves (supplied to the crystal from a suitable electrical source to be described hereinafter) into equivalent acoustic or ultrasonic energy waves in the liquid medium contained within a tank in which are immersed lens 30, transmitter 31, patient 32 and a single row of acoustic detectors 33 positioned in a focal plane of lens 30 on the opposite side from the transmitter. The tank which contains the liquid medium, such as water, is conveniently of a size such that the patient 32 is positioned at one end of the tank and the single row of detectors 33 are positioned near or at the second end thereof. Acoustic detectors 33 may be described as ultrasonic image converters for converting a spatial distribution of the pressure of the reflected ultrasonic energy waves received at the inputs thereof into corresponding electrical voltage signals at the outputs thereof. Detectors 33 are also conventional acoustic transducers which may comprise piezoelectric crystals. The piezoelectric material utilized in the acoustic transmitter and detectors may be lead-zirconium-titinate as one example.

The single row of acoustic detectors 33 is arranged in a straight line along an axis perpendicular to the centerline axis of the apparatus defined by the axis of lens 30 and the center of the detector row (and in the general case also defined by the centerline axis 31a of signal propagation from transmitter 31 to the object 32a being examined), and the detectors are simultaneously responsive to the ultrasonic echo signals arriving from various depths within heart 32a. The visual image formed on a cathode ray tube (or other suitable visual display device) from the outputs of detectors 33 (in a manner to be described with reference to FIGS. 5 and 8) in a planar slice through object 32a in a plane defined by the centerline axis of the apparatus and the axis formed by the line along which acoustic detectors 33 are arranged in a single row. Thus, as depicted in FIG. 3, the image of heart 32a as detected by a single vertical row of detectors 33 is a vertical planar slice through heart 32a from the front to the back thereof assuming that the patient is facing transmitter 31. As distinguished from the narrow beam output of acoustic transmitter 11 utilized in the prior art ultrasonic imaging system described with reference to FIG. 1, the ultrasonic pressure wavefront pattern developed by our single transmitter 31 is sufficiently broad to illuminate the entire object being examined. Thus, in the case of a medical examination of a human heart 32a, the aperture of transmitter 31 and spacing of the transmitter from the patient are selected to obtain ultrasonic irradiation of the entire heart by the pulsed ultrasonic signals emitted from transmitter 31. The ultrasonic signals (pressure waves) in the liquid medium are incident upon the front surface of the patient 32 and pass completely through such patient. At each acoustic heterogeneity, that is, separation surface between two media having different acoustic impedances within patient 32 as well as at front and back surfaces thereof, there is developed an ultrasonic echo signal that is reflected therefrom in many directions. Thus, as illustrated in FIG. 3, two of possibly many ultrasonic reflections developed from an upper point of heart 32a in response to an incident ultrasonic signal emitted from transmitter 31 are focussed or imaged on detectors 33 by means of acoustic lens 30 which is fabricated of a suitable plastic as one example and is of the converging type and may be double convex as one example. The detectors 33 each are simultaneously sensitive to a broad ultrasonic pressure wavefront pattern to thereby receive the multi-directional ultrasonic reflections, each detectors receiving echo signals only from a particular small region of the heart due to the focussing action of lens 30. The distance from lens to object 32a is preferably greater than twice the focal length of lens 30 such that the object imaged upon detectors 33 is smaller than the actual object and inverted. Thus, the single row of acoustic detectors 33 have an overall length dimension (in the vertical as illustrated in FIG. 3) which is substantially smaller than the height of the heart 32a. In a typical example of the relative distances utilized in my FIG. 3 embodiment, the distance from lens 30 to object 32a is twice the distance from lens 30 to detectors 33. In such case, it is evident in accordance with the light refraction properties of lenses that the image formed on detectors 33 is one half the height of the object 32a.

The plurality of acoustic detectors 33 are spaced close together and the resolution of the detected image in the y axis (vertical) direction (see FIG. 4) which is the vertical axis of the row of detectors in FIG. 3 can be improved by increasing the number of detectors in the row without increasing the height thereof, that is, by decreasing the spacing between adjacent detectors. The use of 20 to 100 acoustic detectors is a typical example, although, since the detectors and associated amplifiers to be described hereinafter can be fabricated by integrated circuit technology, the cost of each detector-amplifier is relatively low and it is economically feasibly to use 200 or even 1,000 detectors in a single row. The acoustic detectors and transmitter may each be of dimension in the order of one-sixteenth inch diameter in order to obtain broad pressure wavefront pattern characteristics. There obviously is no reason in spacing the acoustic detectors closer than $\lambda/2$ where $\lambda$ is the wavelength of the ultrasonic energy wave in the liquid medium.

Figure 4:
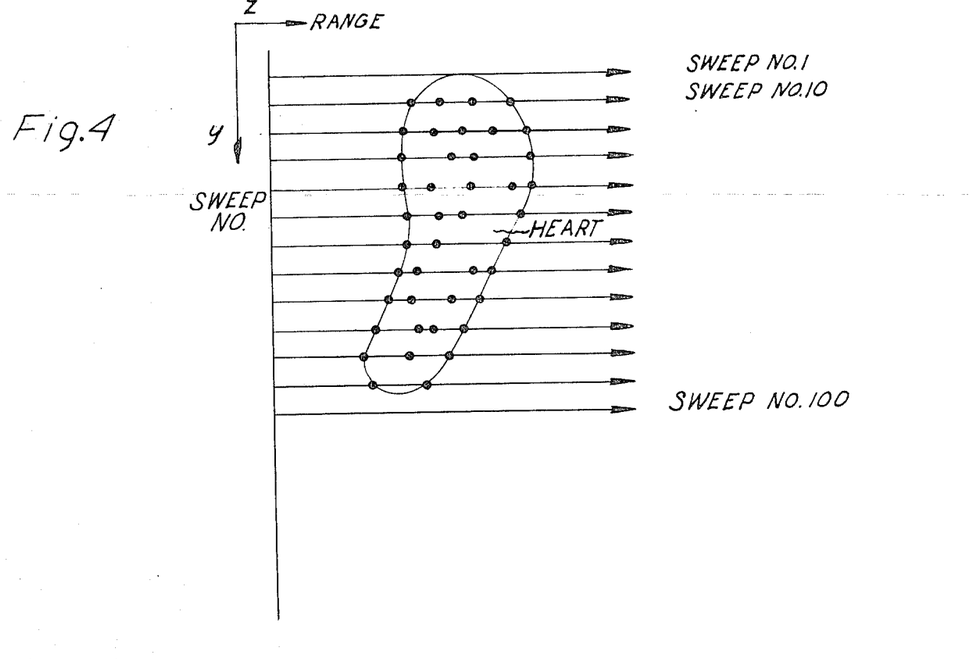
FIG. 4 is a typical cathode ray tube display obtained with the apparatus illustrated in FIG. 3.

Referring now to FIG. 4, there is shown the visual display obtained on the screen of a CRT where the abscissa is herein defined as the Z axis representing the range from the transmitter to the object 32a (i.e., the centerline axis of ultrasonic wave propagation from acoustic transmitter 31 to heart 32a). The ordinate is the $\gamma$ axis representing the sweep line number of the CRT display (i.e., along the axis of the row of acoustic detectors 33). As will be described with reference to FIG. 5, suitable gating means are utilized for gating the amplifiers associated with the acoustic detectors on and off at desired times to thereby define the depth of field being examined within object 32. Thus, appropriate gating of such amplifiers provides a visual display of only the heart 32a or portion thereof on a cathode ray tube (or other suitable visual display device), such display including any acoustic heterogeneities within the heart such as due to heart valves, arteries and so on. Each horizontal sweep line on the display may include one or more dots of light each of which represents an echo signal detected within the defined depth of field within heart 32a by a particular one of the detectors 33.

Figure 5:
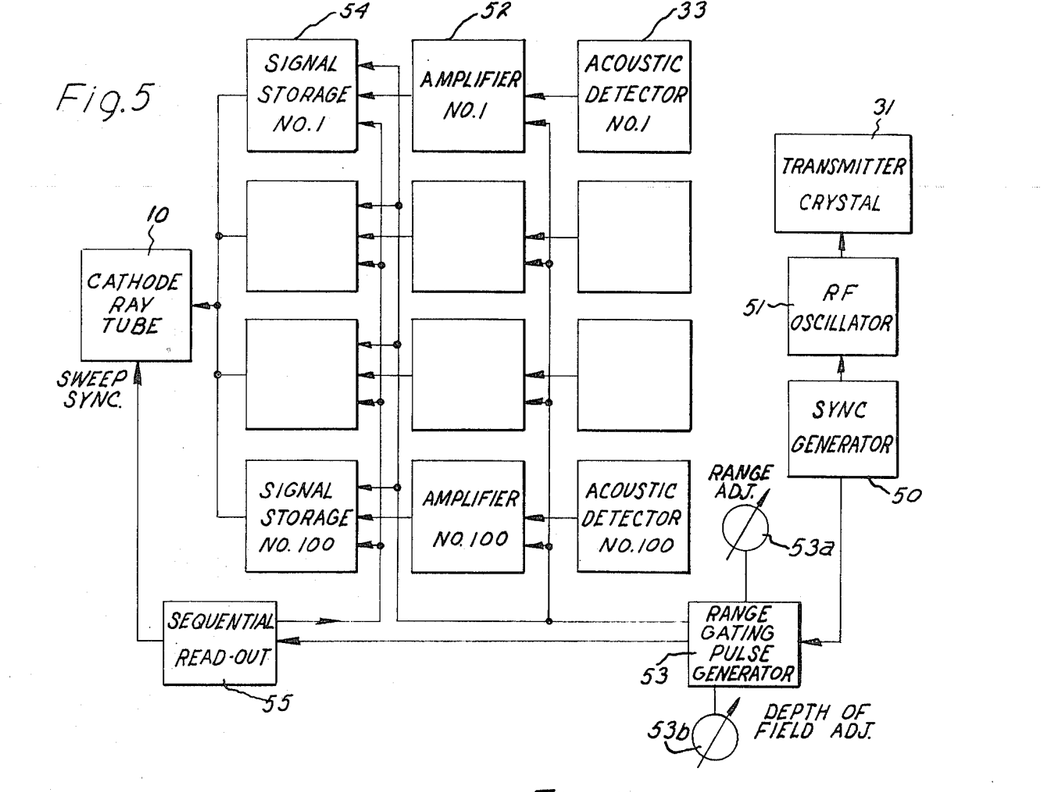
FIG. 5 is a block diagram of the electronic circuitry shown only in part in FIG. 3 for providing the visual display on a conventional cathode ray tube or other serial input visual display device.

Referring now to FIG. 5, there is shown in block diagram form the electronic circuitry associated with acoustic transmitter 31 and acoustic detectors 33. A typical operating mode of our apparatus will now be described with particular reference to the function of each of the components. Assume that acoustic transmitter 31 is 50 centimeters (cm) from the front surface of the patient 32 and that the row of acoustic detectors 33 consists of 100 detectors spaced 150 cm from the front surface of patient 32. A synchronizing generator 50 periodically genertes short duration voltage pulses which control the times of ultrasonic transmission from the piezoelectric crystal of acoustic transmitter 31 and thus synchronizing generator 50 may be described as generating periodic pulses which establish the zero reference time of operation of our apparatus. The duration of the pulse output of synchronizing generator 50 may be in the order of 1 microsecond and is repeated periodically approximately every 10 milliseconds which is the time to produce a complete frame, that is, a complete line-by-line display on the cathode ray tube or other suitable serial input visual display device. The time of 10 milliseconds is also the approximate time for acoustic reverberations to subside in the tank containing the liquid and various components of our apparatus. However, such 10 millisecond time interval can be shortened, if required, by the use of more complex and expensive electronic circuitry. For most applications, it does not appear necessary to read out a single frame of information more rapidly than the acoustic reverberation time of the tank.

Since a complete frame of information can be produced in 10 milliseconds, such complete frame processing can be repeated at a rate of 100 frames per second whereby an object such as the human heart undergoing motion can be viewed on a conventional cathode ray tube 10 and the display is similar to that of a moving image on a conventional television screen. A minimum frame rate of 15 per second is recommended since below 15 frames per second, the flicker effects of the visual display to the human eye becomes bothersome. A photographic movie of the objects' motion can be obtained by synchronizing a conventional movie camera with the frame rate of the display on the cathode ray tube.

The synchronizing generator 50 thus produces a one microsecond pulse at a repetition rate of once every 10 milliseconds. The output of synchronizing generator 50 triggers a radio frequency (RF) oscillator (burst generator) 51 to thereby obtain periodic generation of short bursts (several cycles) of a radio frequency signal which will be assumed to be 2.5 megahertz (MHz) in this example. The ultrasonic frequency range is defined as being between 1 and 10 MHz. Assuming a burst of 5 cycles is generated within RF oscillator 51 for each input synchronizing pulse, such five cycle pulse train is applied to the piezoelectric transmitting crystal 31 and converted to a periodic 2.5 MHz pulsed ultrasonic pressure wave signal of 2 microseconds duration. Since sound travels at approximately 1,500 meters per second in water or flesh, the wavelength of each ultrasonic pulse is 0.6 millimeters (MM) and the physical length of the periodic five pulse ultrasonic pressure wave train is 3.0 mm in water. This 3 mm ultrasonic pulse train requires 330 microseconds to arrive at the front surface of the patient and another 1,000 microseconds for echo signals to begin arriving at the acoustic detectors 33 due to the distance from patient to detectors being three times the distance from patient to acoustic transmitter. Thus, the ultrasonic echo signals of interest arrive at the detectors approximately 1,330 microseconds from the zero reference time extablished by synchronizing generator 50. At the time of 1,330 microseconds after the generation of each periodic synchronizing pulse (zero reference time), the 100 simultaneously responsive detector amplifiers 52 which are connected to the outputs of their associated acoustic detectors 33 are gated on by means of a "turn-on" signal periodically generated within range gating pulse generator 53 in response to the periodic synchronizing pulse. For purposes of economy of cost and space, the acoustic detectors 33 and associated amplifiers 52 are fabricated by integrated circuit technology and may be formed on a single substrate member. The spacing between adjacent detectors 33 can be as small as half a wavelength of the transmitting frequency, as stated hereinabove, and for the case of RF oscillator 51 operating at 2.5 MHz, the half wavelength spacing would be the 0.3 mm. At a transmitting frequency of 10 MHz, such half wavelength spacing would be 0.08 mm.

The periodic "gating-on" signals from range gating pulse generator 53 are supplied to second inputs of each of the 100 amplifiers 52 associated with the 100 acoustic detectors 33 and render responsive such amplifiers to obtain amplification of the low level voltage signals developed in the acoustic detectors 33 in response to the detected ultrasonic echo signals. The outputs of the plurality of detector-amplifiers 52 are connected to the inputs of a like plurality of suitable memory elements 54 for providing temporary storage of the amplified electrical signals corresponding to the ultrasonic echo signals in the desired depth of field defined by range gating pulse generator 53. Thus, the periodic "gating on" of amplifiers 52 also causes the detected echo signals from each of the detectors 33 to be correspondingly periodically stored in parallel in a corresponding number of memory elements 54. The memory component can be electronic semiconductor memories, a videotape or a rotating magnetic disc as three typical examples. The purpose of the temporary signal storage in memory elements 54 is to provide a suitable time delay such that the parallel-addressed memory elements may be read out serially to thereby utilize a conventional cathode ray tube 10 or other suitable serial input visual display device on which to develop the visual display of the ultrasonic echo signals.

The outputs of the above-mentioned memory elements 54 are equal in number to the plurality of acoustic detectors. The amount of interconnection wiring between amplifiers 52 and the visual display device 10 can be minimized by utilizing a multiplexing network at the outputs of amplifiers 52 to thereby obtain a single output which supplies the serial input to CRT 10. The multiplexing network includes a plurality of conventional electronic sample-and-hold circuits having inputs connected to the outputs of associated amplifiers 52 in a manner similar to memory elements 54. The sample-and-hold circuits provide sampling of the amplifier 52 outputs and temporary storage of such data for a known time interval. A shift register or other suitable sequential switching circuit sequentially scans the outputs of the sample-and-hold circuits and supplies such outputs serially along a single output line to CRT 10. The operation of the sequential switching circuit is initiated by the range gating pulse generator 53 in a similar manner to the initiation of sequential read-out 55, and also provides the sweep synchronization for CRT 10.

It will be assumed that the region of interest in the body of the patient 32 is a depth of field of 7.5 cm which requires that the memory elements accept and store the ultrasonic echo signals for a "read-in" period of 100 microseconds. Since this time of 100 microseconds is 50 times the 2 microsecond ultrasonic pulse length, one obtains 50 resolution elements in the horizontal direction (range) on the CRT display. It will further be assumed that three bits per picture element are utilized for grey scale and therefore the total number of bits of signal storage required per detector per pulse is 150 which is readily achieved by existing semiconductor memories at low cost.

After this time interval of 100 microseconds for "read-in" time, amplifiers 52 are gated off (rendered nonresponsive) by means of a periodic "turn-off" signal developed within range gating pulse generator 53, and this gating-off signal also initiates operation of a sequential "read-out" circuit 55 which has a first output providing sequential "read-out" signals to the memory elements 54 and a second output for synchronizing the sweep (scan) on the cathode ray tube with the memory read-out. Thus, the ultrasonic echo signals in electrical form are simultaneously stored (in parallel) in the memory elements 54 and are then sequentially (serially) read out. The reading out of the memories intensity modulates the scan lines on the cathode ray tube to thereby form the image. The stored information can be read out of the memory at the same rate it was put in and thus requires 10 milliseconds to produce a complete frame on the cathode ray tube display, although, as mentioned hereinabove, the readout and display can be done at a faster rate, if required, by the use of more complex and expensive electronic circuitry. The optical display on the CRT has the advantage of providing direct and continuous (as far as the human eye response is concerned) observation of the object being examined, and is of high resolution due to the close spacing of detectors 33 and time domain discrimination of the reflected echo signals.

All of the electronic circuits hereinabove described can be of conventional type. The range gating pulse generator 53 consists of a variable delay generator triggered by the synchronizing pulse from synchronizing generator 50, and the output of the variable delay generator is a delayed trigger pulse having a predetermined delay in relation to the synchronizing pulse which can be adjusted by means of control element 53a. Such delayed trigger pulse is applied to a gating pulse generator which develops a pulse having a leading edge in time coincidence with the leading edge of the delayed pulse and is of duration equal to the gated-on time of the amplifiers 52. The duration of the gating pulse can be adjusted by means of control element 53b and determines the depth of field of inspection in the object being examined. Thus, the periodic pulse generated in component 53 periodically renders amplifiers 52 responsive after a first predetermined interval of time from a periodically occurring zero reference time, and maintains response of the amplifiers for a second predetermined interval of time. The sequential read-out 55 may be a shift register having its plurality of outputs connected to the signal storage elements 54 to thereby provide the sequential read-out thereof as well as for synchronizing the start of each sweep on the cathode ray tube with the read-out.

The entire apparatus including all of the electronic circuitry and ultrasonic imaging components may be mounted in the tank containing the liquid medium in which are developed the ultrasonic energy waves with the exception of cathode ray tube 10 (or other suitable visual display device) which is preferably positioned outside of the tank. Alternatively, only the acoustic transmitter 31, lens 30 and detector-amplifier components are mounted within the tank and the electronic circuitry is located external thereof. Suitable mounting means are provided in the tank for maintaining transmitter 31, lens 30 and detectors 33 in alignment.

The spatial resolution in the Z (range) axis direction can be improved by utilizing a higher frequency of RF excitation of the transmitter crystal 31. Thus, at 10 MHz, a 5 cycle pulse would increase the Z direction spatial resolution to 0.38 mm. For the same depth of field of viewing of 7.5 cm, 200 image (resolution) elements in the horizontal range (Z-axis) direction would be obtained and thus require four times the memory required for the first example of only 50 resolution elements in the Z-axis, The depth of field examined in the object can be increased by proper adjustment of control 53b to thereby gate the amplifiers 52 "on" for a longer time period and correspondingly increasing the memory capacity up to the point of diminishing return at which a depth of focus problem occurs wherein the complete planar slice through the object cannot be focussed upon the single row of detectors. As stated hereinabove, the y-direction resolution of the display can be improved by adding more detectorto the row, i.e., by spacing them more closely together which spacing can be decreased to the limit of one half of the signal propagation wavelength in the liquid.

Figure 6:
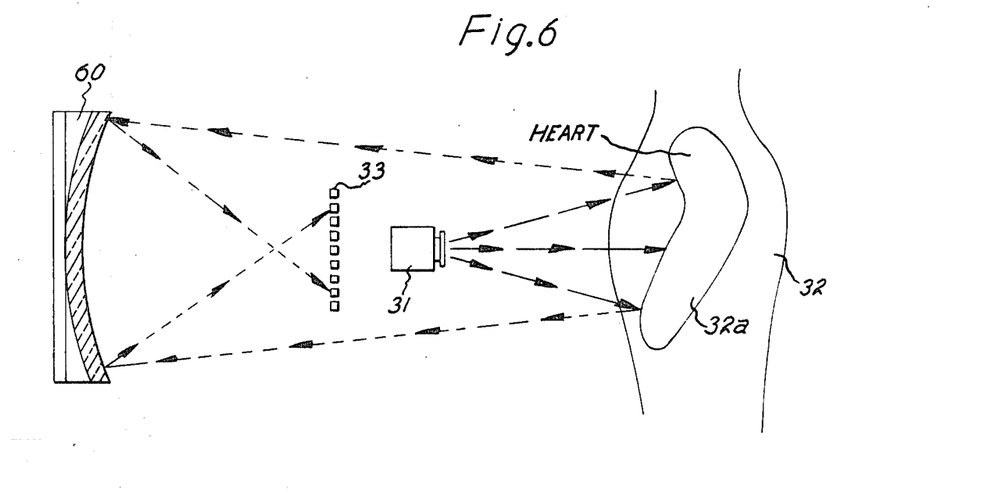
FIG. 6 is a side view of a second and preferred embodiment of the ultrasonic imaging components of our invention.

Referring now to FIG. 6, there is shown a second and preferred embodiment of our invention wherein reflective optics are utilized for focusing the ultrasonic image onto the single row of simultaneously responsive detectors instead of the refractive optics utilized in FIG. 3. In particular, the FIG. 6 embodiment utilizes a concave acoustic reflector 60 which is positioned in alignment with the center of the row of detectors 33 and acoustic transmitter 31 and positioned at the far end of the tank from the patient being examined. Reflector 60 is formed of a suitable metal such as steel and is provided with the desired concave curved surface. The single row of detectors 33 is spaced from reflector 60 typically a distance of approximately 1.5 times the focal length of the reflector which is also established as the midpoint between reflector 60 and object 32 such that the ultrasonic object imaged upon detectors 33 after reflection off reflector 60 is one-half the height of the actual object as in the typical example described with reference to the FIG. 3 embodiment, Acoustic transmitter 31 is positioned between the single row of detectors 33 and the patient, and the transmitter's ultrasonic output is directed toward the patient as in the case of the FIG. 3 embodiment. The FIG. 6 embodiment is preferred over the FIG. 3 embodiment primarily because the acoustic lens is more difficult to fabricate and may suffer undesired reflective losses at the ultrasonic frequencies. The particular example of the system performance described with reference to FIGS. 3 and 5 is also valid for the FIG. 6 (and FIG. 7) embodiments.

Figure 7:
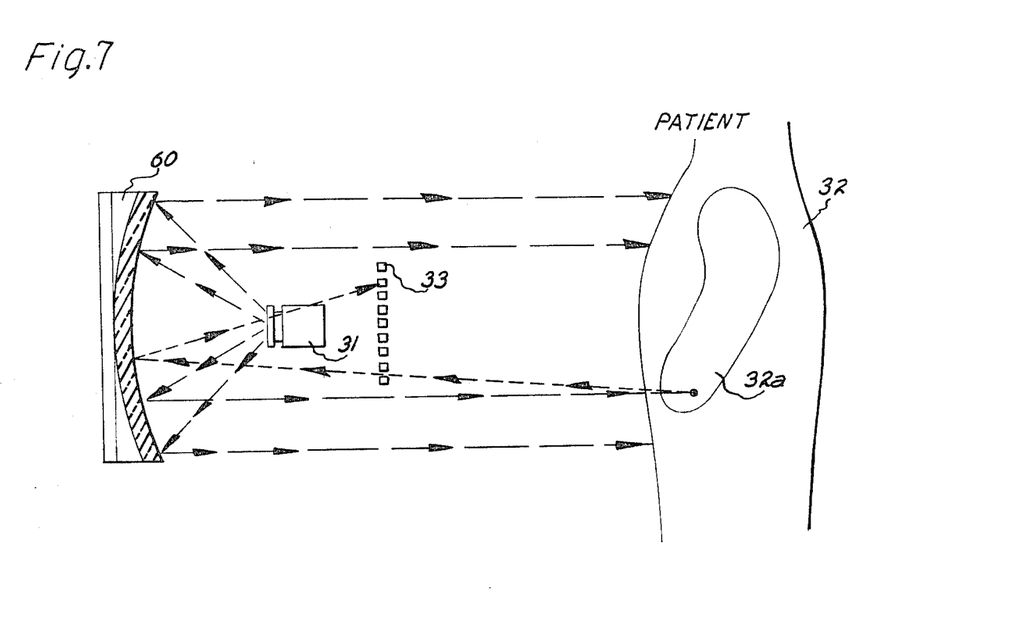
FIG. 7 is a third embodiment of the ultrasonic imaging components of our invention.

Referring now to FIG. 7, there is shown a third embodiment of our invention, also preferred over the FIG. 3 apparatus, wherein, as distinguished from the previous two embodiments, acoustic transmitter 31 directs its ultrasonic energy output at a reflective optics member 60 which may be the concave reflector illustrated in FIG. 6. The advantage of the FIG. 7 embodiment is that by positioning the acoustic transmitter 31 at the focal point of the reflector 60, a resultant parallel (planar) pressure wavefront of the ultrasonic energy waves is directed at the object 32a being examined. This planar wavefront of the incident ultrasonic energy reduces range distortion due to curvature of such wavefront in the FIGS. 3 and 6 embodiments. The single row or simultaneously responsive detectors 33 may again be positioned a spacing of approximately 1.5 times the focal length of reflector 60, and when such detector spacing is approximately mid-way between reflector 60 and object 32, the object imaged upon the detectors is one half the height of the actual object. Obviously, in each of the FIGS. 3, 6 and 7 embodiments the spacing between detectors and focussing optics and, or spacing between the detectors and object being examined may be varied resulting in changes in height of the object imaged upon the detectors in accordance with well known optics theory. In the FIG. 7 embodiment, in the case wherein reflector 60 is smaller than the object 32a being examined, acoustic transmitter 31 is positioned closer to the reflector than the focal point spacing thereof in order to obtain a desired fan-out or spreading of the ultrasonic beam reflected from the reflector to thereby irradiate the object 32a desired to be examined. The visual displays developed from the apparatus of FIGS. 6 and 7 embodiments are identical to that developed from the FIG. 3 embodiment since the electronic circuitry of FIG. 5 is also utilized therewith.

In the FIG. 5 circuit for obtaining a visual display of the ultrasonic echo signals emitted from the object being examined, a conventional cathode ray tube 10 is utilized which requires the use of a memory 54 for temporarily storing the detected signals and a subsequent sequential read-out thereof. The use of such memory or equivalent sample-and-hold circuitry, both of which provide sequential (serial) outputs, can be omitted and the outputs of gated-on amplifirs 52 are simultaneously applied to multi-inputs of a multi-beam cathode ray tube or other multi-input visual display component 80 as illustrated in the block diagram of FIG. 8. In the case of component 80 being a cathode ray tube 80, it is not of conventional design and is described and claimed in concurrently filed patent applications Ser. No. 285,911, inventor Lawrence A. Harris, entitled MULTIBEAM CATHODE RAY TUBE UTILIZING D.A.M. GRID, and Ser. No. 285,912, inventor John M. Houston, entitled INVERTED IMAGE MULTIBEAM CATHODE RAY TUBE, filed concurrently with the present application, each assigned to the assignee of the present invention. Cathode ray tube 80, in the case of a single row of 100 acoustic detectors 33 application, is provided with 100 signal inputs from the outputs of a like 100 detector-amplifiers 52. The FIG. 8 electronic circuitry may be utilized with any of the FIGS. 3, 6 and 7 embodiments as in the case of the FIG. 5 electronic circuitry. The obvious advantage of the FIG. 8 circuit utilizing a multi-beam cathode ray tube as one example is the more rapid display of the signals on the tube since the sweep lines on the CRT are simultaneously generated and the amplifiers 52 supply their outputs simultaneously to the CRT rather than on a line-by-line basis as in FIG. 5. The same range gating pulse generator 53 is utilized for gating the amplifiers 52 on and off as in the case of the FIG. 5 circuit as well as for synchronizing the plurality of sweeps (100 in the case of 100 detectors) on the multi-beam cathode ray tube which are sumultaneously initiated upon the amplifiers 52 being gated on. The electronic circuitry utilized in the FIGS. 5 and 8 block diagrams are conventional and not particularly complex or fast, i.e., much slower than those used in modern computers.

Figure 8:
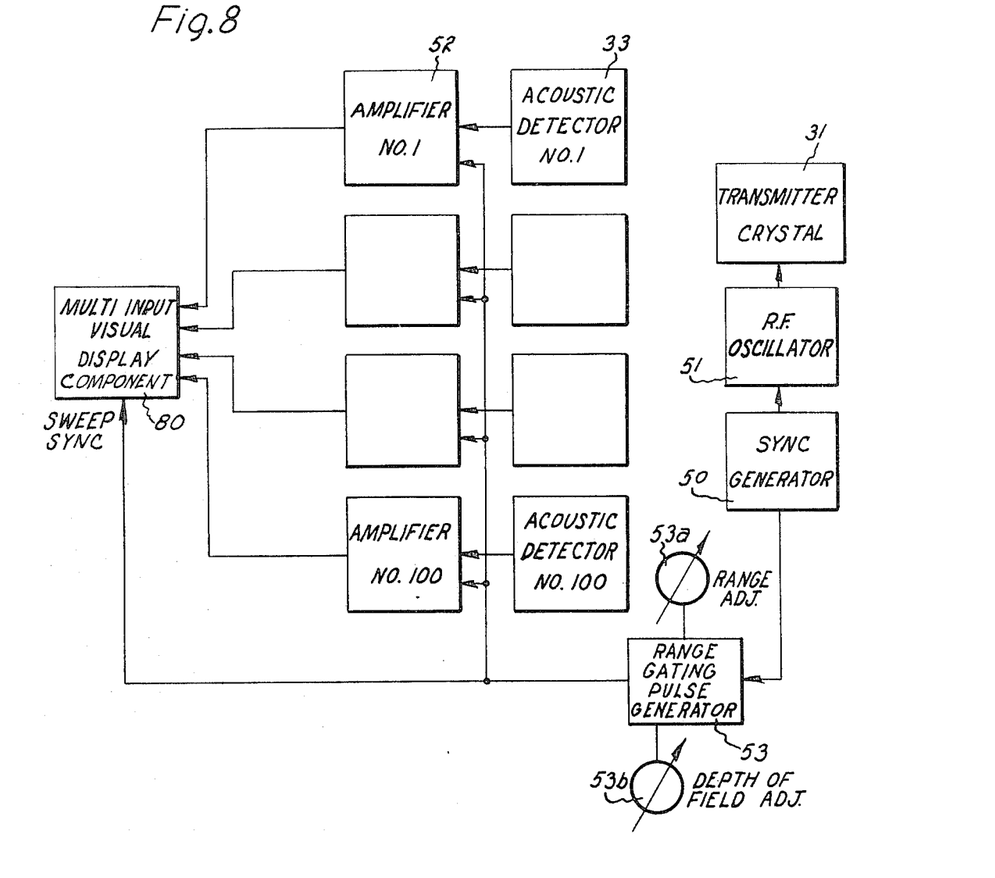
FIG. 8 is a block diagram of the electronic circuitry for providing the visual display on a multi-beam cathdoe ray tube or other parallel input visual display device.

Other examples of simultaneous multi-input visual display components 80 which may be utilized in our FIG. 8 embodiment are (1) a plasma display panel of an array of rows and columns of gas discharge devices, (2) an array of rows and columns of liquid crystals, and (3) an array of rows and columns of light emitting diodes. In each of these components, each row is connected to the output of a corresponding amplifier 52, and each (range) column (i.e., scanning input is sequentially energized by means of appropriate signals generated in a range timing circuit similar to the sequential readout 55 in FIG. 5 and also triggered by range gating pulse generator 53.

From the foregoing description, it can be appreciated that our invention makes available an improved method and apparatus for providing visual display of ultrasonic echo signals reflected from an object being examined. Since the apparatus can discriminate in the time domain and therefore provides visualization in depth, the apparatus is especially useful in medical diagnostics for examining internal organs and blood vessels and may also be utilized for detecting flaws in manufactured objects. The optical display on the cathode ray tube or other visual display device obtained with our apparatus can be directly and continuously observed, and is of high resolution due to the close spacing of the detectors and time domain discrimination of the reflected echoes. The method and apparatus utilizes a single acoustic transmitter and a single row of a plurality of (20 to 1,000) acoustic detectors which convert the detected reflected ultrasonic signals into electrical signals for visual presentation on a visual display device. The visual display is that of a planar slice through the object wherein the plane is defined by the centerline axis of the apparatus defined by the axis of the focussing member and center of the detectors and the axis along which the acoustic detectors are positioned. The thickness of the planar slice, that is, the depth of field in the object being examined is readily controlled by time domain discrimination of the detected reflected ultrasonic signals in a range gating circuit which controls the on and off times of electronic amplifiers connected to the outputs of the acoustic detectors. The apparatus utilized in our system consists of relatively simple and inexpensive components and provides a sufficiently fast response time such that a visual display frame speed in the order of 100 frame per second is readily achieved thereby permitting direct display of the motion of the object being examined such as the human heart, or permitting the taking of movie pictures of such organ's motion.

Having described a number of specific embodiments of our invention, it is believed obvious that modification and variation of our invention is possible in light of the above teachings. Thus, other types of conventional electronic circuitry for achieving the functions described with reference to the FIGS. 5 and 8 block diagrams may be utilized in place of those enumerated therein. Also, although the centerline axis of the apparatus would generally be coincident with the centerline axis of the transmitter, this coincidence is not necessary, and the transmitter can be slightly off-axis thereby eliminating any shadowing effects of the transmitter on the reflected waves. Finally, although the amplifier and storage elements are described and depicted in FIG. 5 as being gated on and off from the output of the range gating pulse generator, it should be obvious that the amplifiers may be continually responsive and only the memory elements need be gated on and off. It is, therefore, to be understood that changes may be made in the particular embodiments as described which are within the full intended scope of the invention as defined by the following claims.

What is claimed as new and desired to secure by Letters Patent of the United States is:

1. Apparatus for providing a visual display of ultrasonic echo signals reflected from an object and its acoustic heterogeneities comprising a single acoustic transmitter for generating a periodic pulsed ultrasonic frequency pressure wave signal in a liquid medium, means for directing the periodic ultrasonic signal at an object being examined, a plurality of closely spaced acoustic detectors arranged in a single row along an axis perpendicular to the centerline axis of the apparatus for simultaneously detecting ultrasonic echo signals reflected from the object in response to the periodic ultrasonic signals incident thereon and for converting the detected ultrasonic signals to equivalent electrical signals, acoustic image focussing means for imaging the ultrasonic echo signals onto said acoustic detectors, the centerline axis of the apparatus being defined by the centerline axis of said focussing means and the center of the row of detectors, a like plurality of amplifying means connected to outputs of associated said acoustic detectors for amplifying the electrical signals developed by said detectors, means in communication with outputs of said signal amplifying means for providing a visual display of the detected echo signals wherein each line of the visual display is associated with a corresponding acoustic detector, means having an output connected to an input of said acoustic transmitter for generating a periodic short duration electrical pulse which triggers the generation of the periodic pulsed ultrasonic signal from said transmitter and also establishes a periodic zero reference time of operation of said apparatus, and means having an input connected to an output of said periodic short duration electrical pulse generating means and an output connected to inputs of said signal amplifying means for simultaneously gating all of the signal amplifying means periodically on and off at desired time intervals corresponding to the range of the object from the transmitter and detectors and to the depth of field in the object being examined, each line of the visual display depicting the echo signals reflected from the object and its internal heterogeneities and detected by the associated acoustic detector within the depth of field defined by said gating means whereby the display represents a visualization in depth of a planar slice of the object wherein the slice lies in a plane defined by the centerline axis of the apparatus and the axis of the single row of detectors.

2. The apparatus set forth in claim 1 wherein
said ultrasonic signal directing means consists of said acoustic transmitter being oriented such that the output thereof is directed toward the object being examined and is aligned with the centerline axis of the apparatus whereby the generated pulsed ultrasonic signal propagates directly from said acoustic transmitter to the object being examined.

3. The apparatus set forth in claim 1 wherein
said acoustic image focussing means is of the reflective concave type and is aligned with the center of said row of detectors and with the centerline axis of signal propagation from said transmitter to the object,
said ultrasonic signal directing means consists of said acoustic image focussing means and the output of said acoustic transmitter being directed toward said acoustic image focussing means and being aligned with the centerline axis of the apparatus whereby the generated pulsed ultrasonic signal propagates from said acoustic transmitter to said acoustic image focussing means and is reflected therefrom toward the object being examined.

4. The apparatus set forth in claim 2 wherein
said acoustic image focussing means is of the reflective concave type and is aligned with the center of said row of detectors and with the centerline axis of signal propagation from said transmitter whereby the ultrasonic echo signals are reflected from said acoustic image focussing means for imaging onto said acoustic detectors.

5. The apparatus set forth in claim 1 wherein
said acoustic image focussing means consists of a converging type acoustic lens positioned between said acoustic detectors and the object being examined and aligned with the centerline axis of signal propagation from said transmitter to the object.

6. The apparatus set forth in claim 1 wherein
said acoustic image focussing means consists of a concave type acoustic reflector aligned with the centerline axis of signal propagation from said acoustic transmitter to the object, said acoustic detectors positioned between said acoustic reflector and the object being examined and spaced from said reflector beyond the focal point thereof.

7. The apparatus set forth in claim 1 and further comprising
means connected between outputs of said amplifying means and an input of said visual display means for temporarily storing the amplified electrical signals, and
means in communication with said gating means for periodically generating sequential signals which are applied to said signal storage means to provide periodic sequential read-out of the amplified electrical signals to said visual display means, said sequential signal generating means also controlling the scan timing of the visual display means for synchronization with the read-out of the stored amplified electrical signals whereby each serial scan depicts the echo signals detected only by an associated acoustic detector within the depth of field defined by said gating means.

8. The apparatus set forth in claim 7 wherein
said visual display means is a cathode ray tube.

9. The apparatus set forth in claim 7 wherein
said visual display means is a cathode ray tube provided with a single signal input connected to a common output of said signal storage means.

10. The apparatus set forth in claim 1 wherein
said visual display means is a parallel input device having a like plurality of inputs connected respectively to separate outputs of said amplifying means whereby the outputs of said amplifying means are simultaneously applied to the plurality of inputs of said visual display means.

11. The apparatus set forth in claim 10 wherein
said visual display means is a multi-input cathode ray tube wherein the sweep lines are simultaneously generated to thereby provide a more rapid display of the detected echo signals.

12. The apparatus set forth in claim 10 wherein
said visual display means is a plasma display panel containing an array of rows and columns of gas discharge devices, the gas discharge devices being connected row-by-row respectively with the outputs of said amplifying means, and the columns being sequentially energized by signals generated in a range timing circuit triggered by said gating means.

13. The apparatus set forth in claim 10 wherein said visual display means is an array of rows and columns of liquid crystals, the crystals being connected row-by-row respectively with the outputs of said amplifying means, and the columns being sequentially energized by signals generated in a range timing circuit triggered by said gating means.

14. The apparatus set forth in claim 10 wherein said visual display means is an array of rows and columns of light emitting diodes, the diodes being connected row-by-row respectively with the outputs of said amplifying means, and the columns being sequentially energized by signals generated in a range timing circuit triggered by said gating means.

15. The apparatus set forth in claim 1 wherein said acoustic transmitter, said acoustic detectors and the object being examined are immersed in the liquid medium.

16. The apparatus set forth in claim 1 wherein said plurality of acoustic detectors are of number in the range of 20 to 1,000.

17. The apparatus set forth in claim 1 wherein said acoustic transmitter is a piezoelectric transducer for converting electrical exciting waves into equivalent ultrasonic pressure waves in the liquid medium in which said transmitter, detectors and object being examined are positioned.

18. The apparatus set forth in claim 1 wherein said acoustic transmitter and detectors are each piezoelectric transducers, the minimum spacing between adjacent acoustic detectors is one half the wavelength of the ultrasonic signal in the liquid medium.

19. The apparatus set forth in claim 18 wherein said acoustic detectors are equally spaced apart.

20. The apparatus set forth in claim 3 wherein said row of acoustic detectors are spaced approximately mid-way between said acoustic image focussing means and the object being examined.

21. The apparatus set forth in claim 1 wherein the wavefront pattern of the periodic ultrasonic pressure wave signal generated by said single acoustic transmitter is sufficiently broad to illuminate the entire object being examined, and the repetition rate of the periodic short duration electrical pulses is at least 15 times a second and thereby is sufficiently rapid to provide a display of motion of the object being examined.

22. Apparatus for providing a visual display of an object undergoing motion and its internal acoustic heterogeneities by means of ultrasonic echo signals reflected therefrom and comprising
a single acoustic transmitter for generating a periodic pulsed ultrasonic frequency pressure wave signal in a liquid medium at a repetition rate of at least 15 times a second, the wavefront pattern of the ultrasonic signal being sufficiently broad to be incident on the entire area of interest on the object being examined,
a plurality of at least 20 closely spaced acoustic detectors arranged in a single row within the liquid medium along an axis perpendicular to the centerline axis of signal propagation from said transmitter, said detectors being simultaneously responsive for detecting ultrasonic echo signals periodically reflected from the object in response to the periodic generated ultrasonic signals incident thereon and for converting the detected ultrasonic echo signals to equivalent periodic electrical signals, each detector being sensitive to a broad ultrasonic pressure wavefront pattern to thereby receive multidirectional reflections from a particular echo producing region in the object being examined,
a concave reflective acoustic image focussing means located within the liquid medium and aligned with the center of the row of detectors and with the centerline axis of signal propagation from said transmitter, said detectors located between said acoustic image focussing means and the object being examined,
a like plurality of amplifiers connected to outputs of associated said acoustic detectors for amplifying the electrical signals developed by said detectors,
means in communication with outputs of said amplifiers for providing a visual display of the detected ultrasonic echo signals,
an electronic synchronizing generator for periodically generating a short duration electrical pulse which initiates the periodic operation of said ultrasonic transmitter and also establishes a periodic zero reference time of operation of said apparatus, and
an electronic range gating pulse generator having an input connected to an output of said synchronizing generator and a first output connected to inputs of said amplifiers for simultaneously gating all of the amplifiers periodically on and off at the repetition rate of generation of the short duration electrical pulses, the gating on time corresponding to the range of the object being examined and the time interval between gating on and gating off corresponding to the depth of field in the object being examined to thereby obtain a time domain discrimination of the ultrasonic echo signals, a second output of said range gating pulse generator providing a periodic synchronizing signal to a scan synchronizing input of said visual display means, each scan line of the visual display depicting the echo signals detected by an associated acoustic detector within the depth of field defined by said range gating pulse generator whereby the display represents a moving visualization in depth of a planar slice of the object while it is undergoing motion wherein the slice lies in a plane defined by the centerline axis of signal propagation from said transmitter and the axis of the single row of detectors.

23. The apparatus set forth in claim 22 and further comprising
memory means connected between outputs of all of said amplifiers and a single signal input of said visual display means for temporarily storing the amplified electrical signals, and
means having an input connected to the second output of said range gating pulse generator and having a first output connected to inputs of said memory means for periodically generating sequential signals for sequentially reading out the memory means and thereby serially supplying the read out amplified electrical signals to the single signal input of said visual display means, and having a second output connected to the scan synchronizing input of said visual display means for synchronizing a line-by-line scan on said visual display means with the sequential readout of said memory means, said visual display means being a serial input device.

24. The apparatus set forth in claim 22 wherein said visual display means being a parallel input device having a like plurality of signal inputs connected to the outputs of associated said amplifiers, the periodic synchronizing signal from the second output of said range gating pulse generator providing a simultaneous synchronization of all the scan lines on said visual display means with the gating on of said amplifiers.

25. A method for providing a visual display of an object which may be undergoing motion and its internal acoustic heterogeneities by means of ultrasonic echo signals reflected therefrom and comprising the steps of generating a periodic pulsed ultrasonic frequency pressure wave signal in a liquid medium from a single acoustic transmitter at a repetition rate of at least 15 times a second, directing the periodic ultrasonic signal at an object being examined, focussing ultrasonic echo signals periodically reflected from the object in response to the periodic generated ultrasonic signals incident thereon upon a single row of closely spaced acoustic detectors arranged along an axis perpendicular to the centerline axis of signal propagation from the transmitter, simultaneously detecting on the single row of acoustic detectors the ultrasonic echo signals and converting the detected ultrasonic echo signals to electrical signals, periodically generating a short duration electrical pulse for initiating the periodic operation of the transmitter and establishing a periodic zero reference time of operation of the apparatus, periodically gating on electrical signal amplifiers connected to outputs of the associated acoustic detectors at a first predetermined time after zero reference time in response to the periodic short duration electrical pulse wherein the gating on time corresponds to the range of the object being examined, periodically gating off the electrical signal amplifiers at a second predetermined time after the first time wherein the time interval between gating on and gating off corresponds to the depth of field in the object being examined to thereby obtain a time domain discrimination of the ultrasonic echo signals, supplying the amplified electrical signals to a visual display device, generating a periodic synchronizing signal in response to the gating on of the amplifiers, and supplying the periodic synchronizing signal to a scan synchronizing input of the visual display device whereby each scan line of the visual display depicts the echo signals detected by an associated acoustic detector within the depth of field defined by the time interval between gating on and off of the amplifiers, the repetition rate of operation of the apparatus and rate of display being sufficiently rapid to obtain a display representing a moving visualization in depth of a planar slice of the object being examined while it may be undergoing motion wherein the slice lies in a plane defined by the centerline axis of signal propagation from the transmitter and the axis of the single row of detectors.

26. The method set forth in claim 25 and further comprising the steps of temporarily storing the amplified electrical signals prior to supplying them to the visual display device, and sequentially reading out the stored amplified electrical signals and serially supplying them to a single signal input of the visual display device which is of a serial input type, the periodic synchronizing signal supplied to the scan synchronizing input of the visual display device providing a synchronization of a line-by-line scan on the visual display device with the sequential reading out of the stored amplified electrical signals.

27. The method set forth in claim 25 wherein the step of supplying the amplified electrical signals to the visual display device consists of simultaneously supplying the outputs of the amplifiers to a plurality of signal inputs of the visual display device equal in number to the number of acoustic detectors in response to the gating on of the amplifiers, the periodic synchronizing signal supplied to the scan synchronizing input of the visual display device which is of a parallel input type provides a simultaneous synchronization of all the scan lines on the visual display with the gating on the amplifiers.

28. The method set forth in claim 25 and further comprising the steps of increasing the resolution of the display on the visual display device along a vertical direction corresponding to the axis of the single row of acoustic detectors by more closely spacing of adjacent detectors, the limit of spacing being half a wavelength of the ultrasonic pressure wave signal in the liquid medium, and increasing the resolution of the display along a horizontal direction corresponding to the depth of field in the object being examined by utilizing a higher frequency of the ultrasonic frequency of excitation of the acoustic transmitter, the ultrasonic frequency being in a range of 1 to 10 megahertz.

* * * * *